United States Patent
Hong et al.

(10) Patent No.: US 12,317,171 B2
(45) Date of Patent: *May 27, 2025

(54) ACCESS CONTROL METHOD AND DEVICE

(71) Applicant: KT CORPORATION, Seongnam-si (KR)

(72) Inventors: Sung-pyo Hong, Seongnam-si (KR); Woo-jin Choi, Seongnam-si (KR)

(73) Assignee: KT CORPORATION, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/492,813

(22) Filed: Oct. 24, 2023

(65) Prior Publication Data

US 2024/0056949 A1 Feb. 15, 2024

Related U.S. Application Data

(63) Continuation of application No. 16/476,971, filed as application No. PCT/KR2018/001241 on Jan. 29, 2018, now Pat. No. 11,838,853.

(30) Foreign Application Priority Data

Feb. 2, 2017 (KR) .................. 10-2017-0015209
Jan. 25, 2018 (KR) .................. 10-2018-0009156

(51) Int. Cl.
*H04W 48/08* (2009.01)
*H04L 1/1607* (2023.01)
(Continued)

(52) U.S. Cl.
CPC .......... *H04W 48/08* (2013.01); *H04L 1/1614* (2013.01); *H04W 48/02* (2013.01); *H04W 76/25* (2018.02)

(58) Field of Classification Search
None
See application file for complete search history.

(56) References Cited

U.S. PATENT DOCUMENTS 9,264,979 B2 2/2016 Fong et al.
9,538,454 B2 1/2017 Hwang et al.
(Continued)

FOREIGN PATENT DOCUMENTS

| KR | 10-2014-0084205 A | 7/2014 |
|---|---|---|
| WO | 2016/006948 A1 | 1/2016 |
| WO | 2016/076603 A1 | 5/2016 |

OTHER PUBLICATIONS

European Patent Office, Extended European Search Report of corresponding EP Patent Application No. 18748552.9, Jul. 24, 2020.

*Primary Examiner* — Wutchung Chu
*Assistant Examiner* — Berhanu D Belete
(74) *Attorney, Agent, or Firm* — INVENSTONE PATENT, LLC

(57) ABSTRACT

An access control technology in a next generation mobile communication network is disclosed. More specifically, disclosed is a technology for controlling an access control operation of a terminal through an integrated category by various methods and layers. One embodiment provides a method by which a terminal performs integrated access control, comprising the steps of: receiving, from a base station, system information including information for access control; indicating access category information from an NAS layer to an AS layer of the terminal when an access attempt is triggered; confirming whether access barring parameter information is included in the system information; and controlling an access barring check operation in the AS (Continued)

layer by using at least one of the access category information and the access barring parameter information.

20 Claims, 6 Drawing Sheets

(51) Int. Cl.
*H04W 48/02* (2009.01)
*H04W 76/25* (2018.01)

(56) References Cited

U.S. PATENT DOCUMENTS

| | | | | |
|---|---|---|---|---|
| 10,397,855 | B2* | 8/2019 | Chun | H04W 48/14 |
| 10,798,639 | B2* | 10/2020 | Chun | H04W 16/02 |
| 10,798,640 | B2* | 10/2020 | Huang-Fu | H04W 48/06 |
| 10,952,125 | B2* | 3/2021 | Lee | H04W 48/02 |
| 2013/0040605 | A1 | 2/2013 | Zhang et al. | |
| 2013/0045706 | A1 | 2/2013 | Hsu | |
| 2013/0107778 | A1 | 5/2013 | Ryu et al. | |
| 2013/0215742 | A1* | 8/2013 | Sirotkin | H04W 28/0247 370/230 |
| 2014/0171061 | A1 | 6/2014 | Larmo et al. | |
| 2014/0171096 | A1* | 6/2014 | Hwang | H04W 48/10 455/452.1 |
| 2014/0248874 | A1 | 9/2014 | Zhang et al. | |
| 2014/0329503 | A1 | 11/2014 | Deng | |
| 2015/0004924 | A1* | 1/2015 | Kim | H04W 28/0247 455/404.1 |
| 2015/0092547 | A1* | 4/2015 | Wu | H04W 4/14 370/230 |
| 2015/0111520 | A1 | 4/2015 | Hsu | |
| 2015/0173119 | A1 | 6/2015 | Wirtanen et al. | |
| 2015/0208334 | A1 | 7/2015 | Zhang et al. | |
| 2016/0128079 | A1* | 5/2016 | Verma | H04W 8/04 370/329 |
| 2016/0205040 | A1 | 7/2016 | Wirtanen et al. | |
| 2017/0013501 | A1* | 1/2017 | Kim | H04W 28/02 |
| 2017/0041854 | A1 | 2/2017 | Kim et al. | |
| 2017/0295536 | A1 | 10/2017 | Kim et al. | |
| 2018/0109992 | A1 | 4/2018 | Lee et al. | |
| 2018/0124679 | A1 | 5/2018 | Lee et al. | |
| 2018/0132164 | A1 | 5/2018 | Kim et al. | |
| 2018/0199263 | A1* | 7/2018 | Huang-Fu | H04W 48/06 |
| 2018/0199273 | A1* | 7/2018 | Chun | H04W 48/14 |
| 2018/0324675 | A1* | 11/2018 | Lee | H04W 48/08 |
| 2019/0141609 | A1* | 5/2019 | Kim | H04W 4/70 |
| 2019/0174392 | A1* | 6/2019 | Chun | H04W 48/02 |
| 2019/0281523 | A1* | 9/2019 | Lee | H04W 36/0007 |
| 2019/0342821 | A1* | 11/2019 | Kim | H04W 74/0833 |
| 2019/0349842 | A1* | 11/2019 | Lee | H04W 48/12 |
| 2019/0350035 | A1* | 11/2019 | Kim | H04L 47/745 |
| 2019/0364489 | A1* | 11/2019 | Liberg | H04L 1/1614 |
| 2019/0380086 | A1* | 12/2019 | Lee | H04W 48/16 |
| 2020/0169863 | A1* | 5/2020 | Kim | H04W 4/90 |

* cited by examiner

FIG.2

| Access Category number (Access Category number) | Conditions related to UE | Type of access attempt |
|---|---|---|
| 0 | All | MO signalling resulting from paging |
| 1 | UE is configured for delay tolerant service and subject to access control for Access Category 1, which is judged based on relation of UE's HPLMN and the selected PLMN. | All except for Emergency |
| 2 | All | Emergency |
| 3 | All except for the conditions in Access Category 1. | MO signalling resulting from other than paging |
| 4 | All except for the conditions in Access Category 1. | MMTEL voice |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories |
| 8-31 | | Reserved standardized Access Categories |
| 32-63 | All | Based on operator classification |

FIG.4

<Access barring parameter information for each access category>

```
UAB-Config ::=          SEQUENCE {
    uab-Category            ENUMERATED {},
    uab-BarringConfig       Barring ID
}
uab-BarringConfig ::=   SEQUENCE {
    Barring ID              ENUMERATE {},
    uab-BarringBitmap       BIT STRING (SIZE ())
    uab-BarringFactor       ENUMERATED {
                                p00, p05, p10, p15, p20, p25, p30, p40,
                                p50, p60, p70, p75, p80, p85, p90, p95},
    uab-BarringTime         ENUMERATED {s4, s8, s16, s32, s64, s128, s256, s512},
    uab-priority            ENUMERATE {allowance, differential allowance, prohibit}
}
```

ACCESS CONTROL METHOD AND DEVICE

CROSS-REFERENCE TO RELATED APPLICATION

This application is a continuation of U.S. application Ser. No. 16/476,971, filed on Jul. 10, 2019, which is a National Stage Patent Application of PCT International Patent Application No. PCT/KR2018/001241, filed on Jan. 29, 2018 under 35 U.S.C. § 371, which claims priorities to Korean Patent Application Nos. 10-2017-0015209, filed on Feb. 2, 2017 and 10-2018-0009156, filed on Jan. 25, 2018, the teachings of which are incorporated herein in their entirety by reference.

TECHNICAL FIELD

The present disclosure relates to a method of performing access control in a next generation mobile communication network, and more specifically, to methods and devices for controlling an access control operation of a user equipment in various manners and layers through an unified category.

BACKGROUND ART

A user equipment and a network perform communication using a limited radio resource. In addition, each entity of the network uses a limited resource for data processing. Accordingly, in order for the user equipment to perform communication with the network, the accessibility of the user equipment to the network may be determined depending on various causes.

For example, an access control function was introduced to control congestion of the network. Such an access control function was defined and performed differently in each protocol layer because it is necessary to control an overload according to situations associated with each layer.

According to such an access control function, a user equipment may be restricted to access a base station, or an RRC connection of the user equipment may be restricted. The network maintained an overall data processing rate of the network by performing congestion control through such a restriction.

Meanwhile, studies on next generation mobile communication technologies have been in progress for satisfying demands for processing a large amount of data at a high-speed. For example, mobile communication systems have developed by employing technologies related to the 3rd generation partnership project (3GPP), such as Long Term Evolution (LTE), LTE-Advanced, 5G, or the like. Such mobile communication systems were designed for transmitting and receiving a large amount of various data, such as video data, radio data, or the like, at a high speed.

As described, an access barring mechanism in the LTE technology was defined to reflect individual requirements of a corresponding environment. Accordingly, it was necessary to implement different individual access barring functions each using different solutions at a network and a user equipment. To this end, it was also required to define individual signaling. As a result, complexity and signaling increased in implementing the access barring mechanism in the network and the UE.

Accordingly, it is necessary to find a solution for eliminating the high complexity and signaling problem in the next generation mobile communication system.

SUMMARY

To address such an issue, in accordance with embodiments of the present disclosure, methods and devices are provided for unifying access control operations that are established by separate mechanisms according to each requirement, and reducing complexity of implementing in a user equipment and a network.

In addition, in accordance with embodiments of the present disclosure, methods and devices are provided for reducing signaling for access control by integrally controlling operations for access control.

In accordance with one aspect of the present disclosure, a method of a user equipment is provided for performing unified access control. The method includes: receiving system information including information for access control from a base station, instructing access category information (hereinafter, may be referred to as an access category number) from an non access stratum (NAS) layer by the user equipment to an access stratum (AS) layer when an access attempt is triggered, checking whether access barring parameter information is included in the system information, and controlling an access barring check in the AS layer using at least one of the access category information and the access barring parameter information.

In accordance with another aspect of the present disclosure, a method of a base station is provided for controlling unified access control operation by a user equipment. The method includes: generating information for access control including at least one of access barring parameter information and barring configuration information, including the information for access control in system information and then transmitting the system information including the information for access control to the user equipment, and receiving access request information by the user equipment determined based on the system information.

In accordance with further another aspect of the present disclosure, a user equipment is provided for performing unified access control. The user equipment includes: a receiver configured to receive system information including information for access control from a base station, and a controller configured to control an non access stratum (NAS) layer of the user equipment to instruct access category information to an access stratum (AS) layer when an access attempt is triggered, and check whether access barring parameter information is included in the system information, and control an access barring check in the AS layer using at least one of the access category information and the access barring parameter information.

In accordance with yet another aspect of the present disclosure, a base station is provided for controlling unified access control operation by a user equipment. The base station includes: a controller configured to generate information for access control including at least one of access barring parameter information and barring configuration information, a transmitter configured to include the information for access control in system information and then transmit the system information including the information for access control to the user equipment, and a receiver configured to receive access request information by the user equipment determined based on the system information.

In accordance with embodiments of the present disclosure, methods and devices are provided for unifying access control in the next generation mobile communication networks/systems/technologies. Therefore, it is possible to reduce implementation complexity and unnecessary signaling and to prevent radio resources from wasting.

BRIEF DESCRIPTION OF THE DRAWINGS

FIG. 2 is a diagram illustrating exemplary access category information according to embodiments of the present disclosure.

FIG. 4 is a diagram illustrating exemplary access barring parameter information for each access category according to embodiments of the present disclosure.

Figure 1:
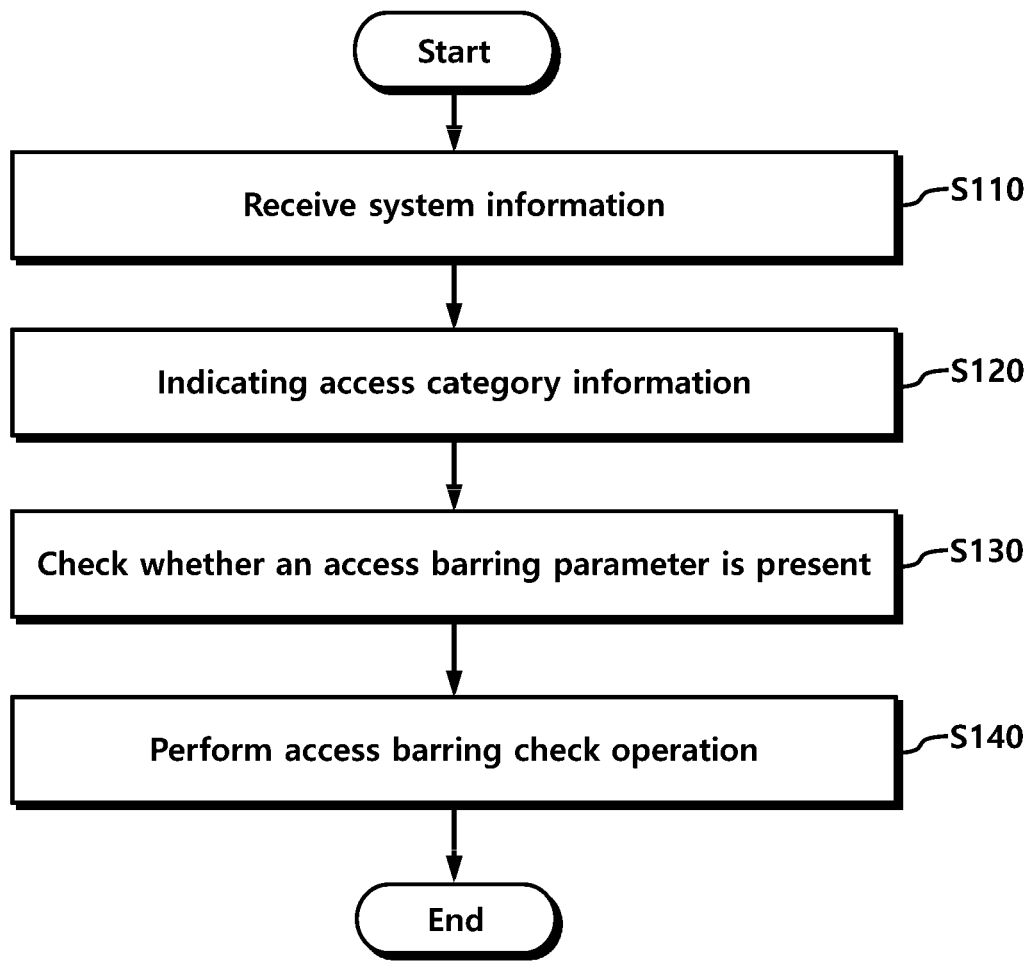
FIG. 1 is a flowchart illustrating an operation of a user equipment according to embodiments of the present disclosure.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present disclosure, a wireless communication system refers to a system for providing various communication services such as a voice communication service, a packet data service, etc. The wireless communication system includes user equipment (UE) and a base station (BS).

The UE is a generic term referring to devices used in wireless communication. For example, the UE may be referred to, but not limited to, a UE supporting wideband code division multiple access (WCDMA), long term evolution (LTE), high speed packet access (HSPA), international mobile telecommunications (IMT)-2020 (5G or new radio), or the like, a mobile station (MS) supporting the global system for mobile communication (GSM), a user terminal (UT), a subscriber station (SS), a wireless device, or the like.

The base station or a cell generally refers to a station communicating with the UE. The base station or the cell is a generic term referring to, but not limited to, all of various communication service areas and devices, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

Each of the various cells is controlled by a base station. Therefore, the base station may be classified into two categories. 1) The base station may be referred to an apparatus that forms a corresponding communication service area, such as a megacell, a macrocell, a microcell, a picocell, a femtocell, and a small cell, and provides a communication service within the corresponding communication service area or 2) the base station may be referred to a communication service area. In the case of 1), the base station may be referred to i) apparatuses controlled by the same entity to provide a communication service within the communication service area or ii) apparatuses interacting and cooperating with each other for providing a communication service area within a corresponding communication service area. According to communication schemes employed by a base station, the base station may be referred to as a point, a transmission/reception point, a transmission point, a reception point, or the like. In case of 2), the base station may be a communication service area itself where UEs able to receive signals from or transmit signals to other UEs and neighboring base stations.

In the present disclosure, the cell may also refer to a coverage of a signal transmitted from a transmission/reception point, a component carrier having the coverage of a signal transmitted from a transmission point or a transmission/reception point, or a transmission/reception point itself.

The UE and the base station are two entities for performing transmission/reception used to embody the technology and technical spirit described in the present specification. The UE and the base station are a generic term and not limited to specific terms or words.

Herein, the uplink (hereinafter, referred to as "UL") refers to data transmission/reception by a UE to/from a base station, and the downlink (hereinafter, referred to as "DL") refers to data transmission/reception by a base station to/from a UE.

UL transmission and DL transmission may be performed by employing i) a time division duplex (TDD) technique performing transmission through different time slots, ii) a frequency division duplex (FDD) technique performing transmission through different frequencies, or iii) a hybrid technique of the frequency division duplex (FDD) and the time division duplex (TDD).

Further, the related standard of the wireless communication system defines configuring the UL and the DL based on a single carrier or a pair of carriers.

The UL and the DL transmit control information through one or more control channels, such as a physical DL control channel (PDCCH), a physical UL control channel (PUCCH), and the like. The UL and DL transmit data through data channels, such as a physical DL shared channel (PDSCH), a physical UL shared channel (PUSCH), and the like.

The DL may denote communication or a communication path from multiple transmission/reception points to a UE, and the UL may denote communication or a communication path from the UE to the multiple transmission/reception points. In the DL, a transmitter may be a part of multiple transmission/reception points, and a receiver may be a part of a UE. In the UL, a transmitter may be a part of a UE and a receiver may be a part of multiple transmission/reception points.

Hereinafter, transmission and reception of a signal through a channel such as the PUCCH, the PUSCH, the PDCCH, or the PDSCH, may be described as the transmission and reception of the channel such as the PUCCH, the PUSCH, the PDCCH, or the PDSCH.

Meanwhile, higher layer signaling includes radio resource control (RRC) signaling transmitting RRC information containing an RRC parameter.

The base station performs DL transmission to UEs. The base station may transmit a physical DL control channel for transmitting i) DL control information, such as scheduling required to receive a DL data channel that is a primary physical channel for unicast transmission, and ii) scheduling approval information for transmission through an UL data channel. Hereinafter, transmitting/receiving a signal through each channel may be described in such a manner that a corresponding channel is transmitted/received.

Any of multiple access techniques may be applied to the wireless communication system, and therefore no limitation is imposed on them. For example, the wireless communication system may employ various multiple access techniques, such as time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, or the like. The NOMA includes sparse code multiple access (SCMA), low cost spreading (LDS), and the like.

Embodiments of the present disclosure may be applied to resource allocation in i) asynchronous wireless communication evolving into LTE/LTE-advanced and IMT-2020 from GSM, WCDMA, and HSPA, ii) synchronous wireless communication evolving into CDMA, CDMA-2000, and UMB.

In the present disclosure, a machine type communication (MTC) terminal may refer to a terminal supporting low costs (or low complexity), a terminal supporting coverage enhancement, or the like. As another example, the MTC terminal may refer to a terminal defined as a predetermined category for supporting low cost (or low complexity) and/or coverage enhancement.

In other words, the MTC terminal may refer to a low cost (or low complexity) user equipment category/type newly defined in 3GPP Release-13 and performing LTE-based MTC-related operations. The MTC device of the present disclosure may refer to a device category/type that is defined in or before 3GPP Release-12 that supports enhanced coverage in comparison with the existing LTE coverage or supports low power consumption, or may refer to a low cost (or low complexity) device category/type newly defined in Release-13. The MTC terminal may refer to a further enhanced MTC terminal defined in Release-14.

In the present disclosure, a narrowband Internet of Things (NB-IoT) terminal refers to a terminal supporting radio access for cellular IoT. NB-IoT technology aims to improve an indoor coverage, to support large-scale low-speed terminals, to lower latency sensitivity, to reduce terminal costs, to lower power consumption, and to optimize network architecture.

An enhanced mobile broadband (eMBB), massive machine-type communication (mMTC), and ultra-reliable and low latency communication (URLLC) are representative usage scenarios for NR in the 3GPP.

In the present disclosure, a frequency, a frame, a subframe, a resource, a resource block (RB), a region, a band, a sub-band, a control channel, a data channel, a synchronization signal, various reference signals, various signals, and various messages, associated with NR may be interpreted as meanings that were used in the past or are used in the present or as various meanings that will be used in the future.

For example, in the present disclosure, the LTE and the NR denote different radio access technologies. The term "NR" refers to a new radio access technology under discussion in Release-15 of the 3GPP. The NR may include various differences compared with the LTE, such as a different frame structure, channel, core network technology, or the like. The NR may additionally include wireless transmission in a high band, transmission of a large volume of data or transmission of data in high speed.

Embodiments described below may be applied to UEs, base stations, and core network entities (e.g., MME, AMF, etc.), using next generation mobile communication (5G mobile communication, New-RAT, NR). For ease of understanding and convenience of description, the base station may denote a base station including a central unit (CU) and a distributed unit (DU) which are physically separated from each other in a 5G radio network and implemented as one logical entity. The base station may also denote a gNB.

Hereinafter, for convenience of description and ease of understanding, a typical radio access technology is referred to as LTE, and the new radio access technology under discussion in the 3GPP is referred to as the NR. A base station may be an eNB employing the LTE technology or a gNB employing the NR technology, and one of the eNB and the gNB will be used, when needed.

NR (New Radio)

Recently, the 3GPP has approved the "Study on New Radio Access Technology", which is a study item for research on next-generation/5G radio access technology. On the basis of the Study on New Radio Access Technology, discussions have been in progress for frame structures, channel coding and modulation, waveforms, multiple access methods, and the like for the new radio (NR).

The NR is required to be designed not only to provide an improved data transmission rate as compared with the LTE/LTE-Advanced, but also to meet various requirements per detailed and specific usage scenario. An enhanced mobile broadband (eMBB), massive machine-type communication (mMTC), and ultra-reliable and low latency communication (URLLC) are proposed as representative usage scenarios of the NR. In order to meet the requirements per usage scenario, it is required to design the NR to have flexible frame structures, compared with the LTE/LTE-Advanced.

Specifically, the eMBB, mMTC, URLLC are considered as representative usage scenarios of the NR in the 3GPP. Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios through a frequency band provided to an arbitrary NR system.

To this end, there have been discussions on i) methods of multiplexing numerologies having subcarrier spacing (SCS) values different from one another based on TDM, FDM or TDM/FDM through one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms. Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot made up of fewer symbols than the slot has been defined in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a per-slot basis based on 0.5 ms (7 symbols) or 1 ms (14 symbols) defined in a frame structure based on a numerology having a small SCS value, for example, 15 kHz, latency requirements may be difficult to be satisfied. To this end, a mini-slot is defined to include fewer OFDM symbols than the slot. Thus the scheduling for the latency critical data, such as the URLLC, may be performed based on the mini-slot.

Thus, since different SCSs or different TTI lengths were defined in the NR, technologies have been developed for satisfying requirements of each of the URLLC and the eMBB, and new technical elements are needed to be developed from various viewpoints, such as in a transmission unit structure and a scheduling method in relation to the LTE.

Access barring is a type of access control operation performed by a UE for congestion control of a network. It is considered that the access barring includes an access barring check operation for checking whether access is barred. Accordingly, the access barring may be interchanged by various terms, such as congestion control, access control, access check, barring check, access restriction, access barring, or the like. That is, it is considered that the access barring herein includes all such terms.

Hereinafter, access control operations in atypical LTE mobile communication technology, shortcomings thereof, and objectives of the present disclosure will be briefly described.

Access Barring in the LTE

In the LTE, an access control function for congestion control of a relevant network has been defined differently in each protocol layer. Thus, congestion control is performed according to situations associated with each layer. As access control functions in the LTE, there are an RACH backoff function that is used when a base station suffers from overload during a random access procedure, a function for enabling a base station to reject an RRC connection for an RRC connection request or to release a connected RRC connection according to a radio resource condition and load, and an access barring function for enabling a base station to prevent a user equipment from sending signaling for access request to a network.

The access barring mechanism is UE-based access control. The access barring prevents a UE from sending signaling for access request to a network. Therefore, the access barring efficiently reduces load.

In the typical LTE (E-UTRAN), several types of access barring mechanisms have been defined and used. That is, several mechanisms have been defined to satisfy the various service requirements that have gradually needed in the process of commercially implementing LTE technology. Each mechanism uses a different solution from one another. For example, access class barring (ACB) for allowing access barring for UEs with a specific access class is performed in an access stratum (AS) layer. On the other hand, service specific access control (SSAC) is performed in an application layer because this is provided for enabling additional control for a multimedia telephony (MMTEL) voice call which is applied in the IP multimedia subsystem (IMS) layer. Application specific congestion control for data communication (ACDC) is performed in the AS layer. However, it is necessary to use non-standardized parameters, such as an application ID, which are not defined in the 3GPP. That is, it is necessary to standardize such non-standardized parameters. If not, it could be very difficult to apply those functions in a UE and a network. In addition, different access barring functions have been individually implemented in a network and a UE, such as, ACB skip for skipping the ACB for a voice, extended access barring (EAB) for access control for an MTC terminal, or the like. Accordingly, it is necessary to define and apply different signaling processes according to the corresponding access barring functions.

Recently, the 3GPP has carried out studies for a next generation/5G radio access technology (hereinafter, for convenience of description, referred to as a new radio (NR)). In the NR, it is possible to include additional functions satisfying various requirements which have not been provided by the LTE. Among these functions, it is necessary to include a unified access barring mechanism for satisfying various usage cases and scenarios defined in LTE. However, corresponding methods have not been proposed.

That is, in the LTE, several types of mechanisms have been defined to reflect various service requirements that have gradually needed as the LTE technologies have been commercially implemented. Accordingly, several types of access barring mechanisms have been defined and used. That is, several different access barring functions using different solutions from one another have been implemented in a network and a UE. Accordingly, it has been necessary to define different signaling processes for several different access barring functions and apply the different signaling processes to the network and the UE. Thus, implementation complexity and signaling are increased significantly.

It is an object of the present disclosure to solve such problems and to provide an efficient unified access barring method and apparatus which satisfy various usage cases and scenarios expected in a next generation mobile communication network.

Hereinafter, operations of a UE and a base station for performing an efficient unified access barring method in accordance with embodiments will be described in detail.

FIG. 1 is a flowchart illustrating operations of a UE according to embodiments of the present disclosure.

Referring to FIG. 1, the UE may perform an operation for receiving system information including information for access control from a base station, at step S110. For example, the UE may receive the system information broadcast by the base station. The system information may include the information of access control.

For example, the information for access control may include at least one of access barring parameter information and barring configuration information. The access barring parameter information may be included in the access barring configuration information and may include parameters that are necessary for the UE to perform an access barring check operation.

As another example, the information for access control may be included in minimum system information of the system information and received by receiving the minimum system information. The minimum system information is broadcast at a fixed period and includes basic information needed for initial access and scheduling information for acquiring other system information which is broadcast periodically or provided on demand. That is, the minimum system information denotes system information broadcast according to a fixed period without separate scheduling information, and not limited to any specific name. As further another example, the information for access control may be included in other system information and received by receiving the other system information.

The UE may receive the system information periodically or upon the occurrences of a specific event. The UE is required to ensure that it has a valid version of system information. The UE is required to have a valid version of minimum system information.

In addition, when access attempt is triggered, the UE may perform an operation for indicating category information from the NAS layer to the AS layer, at step S120. When an event for allowing the UE to access a base station or a network occurs, the UE attempts access to the base station. Thus, when access attempt is triggered according to an internal process of the UE, the NAS layer of the UE may inform access category information to the AS layer.

For example, the access category information may be set for each access attempt type that is classified based on a type of application service of the UE. As another example, the access category information may be set for each access attempt type that is classified based on a transmission signaling processing procedure of the UE. As further another example, the access category information may be set for each access attempt type that is classified based on a transmission signaling processing procedure and an access attempt type of the UE. That is, the access category information includes information classified based on a pre-set criterion according to an access processing procedure of the UE.

Meanwhile, the access category information may be configured in advance in the UE and the base station. The access category information may be transmitted by the base station to the UE. The access category information may be variously set by an operator managing the base station, and there is no limitation thereto.

FIG. 2 is a diagram illustrating exemplary access category information according to embodiments of the present disclosure.

Referring to FIG. 2, the access category information may be indicated using index information, and the access category information may be variously set according to UE configuration information and an access attempt type related to the UE. For example, the access category information for an emergency may be set as 2 for all UEs.

In addition, the UE may perform an operation for checking whether access barring parameter information is included in system information, at step S130. When the access category information is indicated from the NAS layer, and when the access attempt is triggered, the UE may check whether the access barring parameter information is included in the system information.

That is, the UE can check whether the access barring parameter information is included in the system information and determine whether to perform the barring check operation.

Here, the access barring parameter information may be set in association with UE configuration information of the UE. For example, the access barring parameter information may be set for each UE configuration information of the UE, and received through the system information.

As another example, the access barring parameter information may be set in association with the access category information. For example, the access barring parameter information may be set equally or differently for each access category information. As another example, one barring parameter information may be set in association with a plurality of access category information.

As another example, the access barring parameter information may be set in association with both UE configuration information of the UE and the access category information.

Meanwhile, the access barring parameter information may be included in specific information of barring configuration information for each access category information. That is, the access barring parameter information may be included in the barring configuration information that is set for each access category information, and then transmitted to the UE.

The barring configuration information may include at least one of barring identification information, barring factor information, barring time information and barring bitmap information according to configuration information of a UE. For example, the barring identification information may mean index information based on types of barring classified according to a pre-set criterion. The barring factor information may include a ratio value for random barring. For example, the UE may extract a random number, compare the number with a barring factor, and perform access control based on the comparing result. The barring time information may include time information, such as a timer related to barring of a UE, or the like. The barring bitmap information is used to determine whether the UE skips the barring check operation by comparing the barring bitmap information with corresponding UE configuration information.

In addition, the UE may perform an operation for controlling the access barring check operation in the AS layer using at least one of the access category information and the access barring parameter information, at step S140.

When access attempt is triggered, the UE may perform the access barring check operation in the AS layer. For example, the UE may determine whether to perform the barring check operation in a corresponding access category using access category information and barring configuration information (including barring parameter information) provided by the AS layer. More specifically, when the access category information indicates an emergency communication, the UE may skip the barring check operation.

In addition, the UE may determine whether to perform the barring check operation using pre-set UE configuration information and barring parameter information. More specifically, the UE may check whether corresponding barring bitmap information in accordance with UE configuration information is set as a pre-set value, and when the barring bitmap information matches the pre-set value, skip barring check operation for corresponding access attempt. In this case, the UE configuration information may be determined as one of access classes 11, 12, 13, 14 and 15. For example, the pre-set value described above may be configured in advance in the UE, or mean a value stored after determined in advance.

Normally, in case the UE configuration information includes access class information, one UE configuration information may be set for each UE. It should be considered that one or more access class information or one or more UE configuration information may be set for each UE. In this case, the UE may skip access barring check operation when at least one of an access class or one or more UE configurations allows to skip access barring check through a corresponding barring bitmap.

Through operations described above, the UE may determine whether to perform integrally an access barring check operation for various access attempt, such as a transmission signaling request. Accordingly, it is possible to restrict unnecessary signaling in comparison with the typical technology and to solve a compatibility problem resulted from a separate barring check operation for each layer of a UE or for each service.

Hereinafter, control operation of a base station in accordance with the above operation will be discussed.

Figure 3:
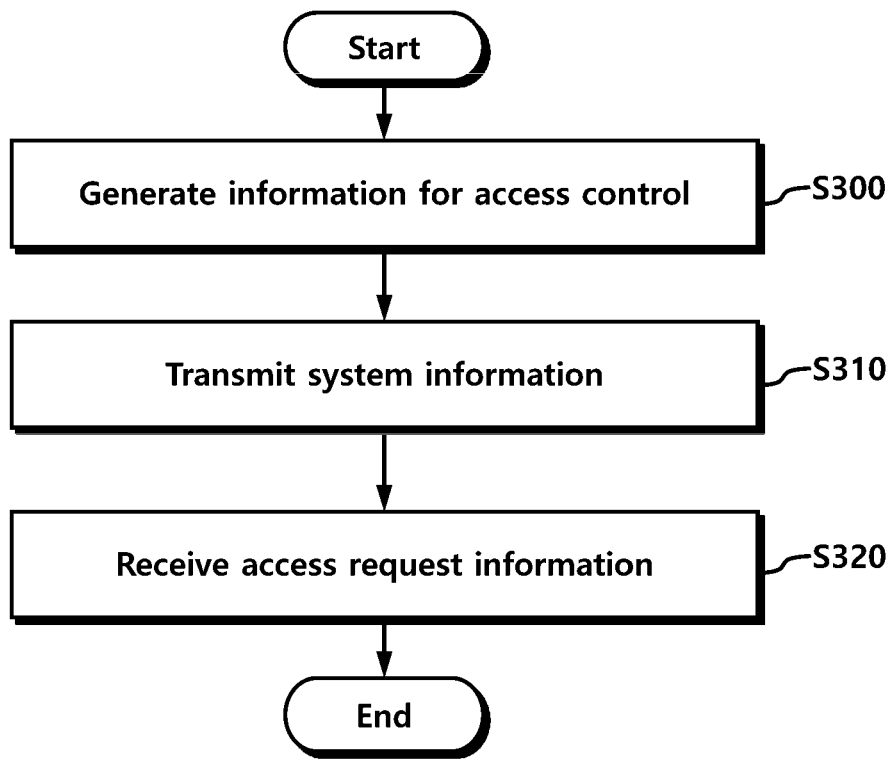
FIG. 3 is a flowchart illustrating an operation of a base station according to embodiments of the present disclosure.

FIG. 3 is a flowchart illustrating operations of abase station according to embodiments of the present disclosure.

Referring to FIG. 3, the base station may perform an operation for generating information for access control including at least one of access barring parameter information and barring configuration information, at step S300. For example, the base station may generate information for controlling an access barring operation of a UE.

For example, the information for access control may include at least one of access barring parameter information and barring configuration information. The access barring parameter information may be included in the access barring configuration information and may include parameters that are necessary for the UE to perform an access barring check operation.

As another example, the access barring parameter information may be set in association with UE configuration information of the UE. For example, the access barring parameter information may be set for each UE configuration information of the UE.

As another example, the access barring parameter information may be set in association with access category information. For example, the access barring parameter information may be set equally or differently for each access category information. As another example, one barring parameter information may be set in association with a plurality of access category information.

As further another example, the access barring parameter information may be set in association with both UE configuration information of the UE and the access category information.

The barring configuration information may include at least one of barring identification information, barring factor information, barring time information and barring bitmap information according to configuration information of a UE. For example, the barring according to a pre-set criterion. The barring factor information may include a ratio value for random barring. For example, the UE may extract a random number, compare the number with a barring factor, and perform access control based on the comparing result. The barring time information may include time information, such as a timer related to barring of a UE, or the like. The barring bitmap information is used to determine whether the UE skips the barring check operation by comparing the barring bitmap information with corresponding UE configuration information.

In addition, the base station may perform an operation for including the information for access control in system information and then transmitting the system information including the information for access control to a UE, at step S310.

For example, the information for access control may be received by being included in minimum system information of the system information. The minimum system information is broadcast at a fixed period and includes basic information needed for initial access and scheduling information for acquiring other system information which is broadcast periodically or provided on demand. That is, the minimum system information denotes system information broadcast according to a fixed period without separate scheduling information, and not limited to any specific name. As another example, the information for access may be included in other system information and received through the other system information. In addition, the information for access may be transmitted periodically or every when a specific event occurs.

Meanwhile, the access barring parameter information may be included in specific information of barring configuration information for each access category information. That is, the access barring parameter information may be included in the barring configuration information that is set for each access category information and then transmitted to the UE.

In addition, the base station may perform an operation for receiving access request information of the UE determined based on the system information, at step S320.

The base station may receive the access request information according to an access control operation determined by the UE based on the system information. When the UE is barred to perform corresponding access attempt according to an access barring check operation, the base station may not receive the access request information. Alternatively, when the access barring check operation is skipped, or access barring is not instructed even when the access barring check operation is performed, the base station may receive the access request information from the UE.

For example, when access attempt is triggered using the received information for access control, the UE may perform the access barring check operation in the AS layer. For example, the UE may determine whether to perform the barring check operation in a information (including barring parameter information) informed from the AS layer. More specifically, when the access category information indicates an emergency communication, the UE may skip the barring check operation.

As another example, the UE may determine whether to perform the barring check operation using pre-set UE configuration information and barring parameter information. More specifically, the UE may check whether corresponding barring bitmap information in accordance with UE configuration information is set as a pre-set value, and when the barring bitmap information matches the pre-set value, skip barring check operation for corresponding access attempt. In this case, the UE configuration information may be determined as one of access classes 11, 12, 13, 14 and 15.

Normally, in case the UE configuration information includes access class information, one UE configuration information may be set for each UE. It should be considered that one or more access class information or one or more UE configuration information may be set for each UE. In this case, the UE may skip access barring check operation when at least one of an access class or one or more UE configurations allows to skip access barring check through a corresponding barring bitmap.

As described above, the base station generates various information used for enabling a UE to perform access barring check and provides the generated information to the UE, Therefore, the base station can control the access control operation of the UE.

Operations of a UE and a base station in accordance with embodiments of the present disclosure have been discussed with reference to FIGS. 1 to 3. Embodiments of the present disclosure are not limited thereto. Other embodiments, as well as the above embodiments, may be performed in the UE and the base station.- - - - - -

Hereinafter, further various embodiments will be discussed with respect to steps, methods, functions etc. Embodiments described below may be perform individually, in combination with operations of the UE and the base station described above, or in combination with one or more of embodiments or examples described below. In addition, the present disclosure may be applied to any mobile communication, wired communication, wireless communication, or fixed communication networks, as well as the next generation mobile communication (5G mobile communication) network.

Meanwhile, the term "category" described below includes an access category for classifying access attempt types classified according to a specific service or a specific access procedure, and an access identifier for classifying types classified according to subscription information or a UE configuration. This is for the purpose of avoiding the complexity in explaining embodiments in case one or more embodiments of the access category are overlapped with one or more embodiments of the access identifier, and a description section described as the category can be understood by being divided into an access category embodiment and an access identifier embodiment. In addition, when necessary, embodiments may be described by both the access category and the access identifier.

In addition, the terms such as category, access category, access identifier, etc. are example terms for ease of understanding, and all description and/or all names including these terms are included within the scope of the present disclosure.

A Method of Defining an Access Control Category Assigned by an Operator

For providing unified access barring, an operator may classify a category/class/group/type/indicator for providing access barring according to a specific UE, a specific application, a specific service, a specific procedure, specific subscription information, a specific QoS class mapping flow, a specific authority authentication confirmation, an RRC state, a specific barring check layer, a specific PLMN, a specific network slice, or a combination thereof, and access bearing may be provided according to each access barring/control category. Hereinafter, a category/class/group/type/indicator are referred to as "category". This is for convenience of description, and any UE type, procedure type, service type, subscription information type, or combination thereof, to which unified access control is provided, may be one category/class/group/type/indicator. The operator may assign a specific access category to access attempt in accordance with a specific application, a specific service, or a specific procedure. The operator may inform a UE of the access attempt assigned to the specific access category through a network. As another example, the operator may set information for enabling specific subscription information to be as signed as a specific access indicator/identifier/differentiating factor, and then inform the UE of the set information through a network. For example, a corresponding access category or a corresponding access indicator/identifier/differentiating factor may be informed of a UE by transmitting an NAS signaling message by a core network control plane entity to the UE. As another example, this may be informed of a UE through an RRC message by a base station. As further another example, this may be configured in advance in a UE.

For example, the operator may assign a specific access indicator/identifier/differentiating factor to a specific UE group according to subscription information. For example, the operator may assign specific access indicator/identifier/differentiating factor to a UE of access classes (AC) 11 to 15, an operator testing UE, or the like. In the typical LTE technology, the access classes (AC) 11 to 15 denote UE configurations for specific users. A UE may store, in the SIM/USIM, values for public land mobile network (PMLN) use in case of AC 11, values for a security service in clause of AC 121, values for public utilities in case of AC 13, values for an emergency service in case of AC 14, and values for PLMN staff in case of AC 15.

As another example, a specific access indicator/identifier/differentiating factor may be assigned to UE configuration with subscription information for a specific service. For example, a specific access indicator/identifier/differentiating factor may be assigned to an emergency call, high priority access, a multimedia priority service, a public safety/mission critical service/application.

As another example, a specific access indicator/identifier/differentiating factor may be assigned based on specific subscription information. For example, a core network entity may receive specific subscription information from a subscriber information server in the process of attaching a UE to network. A base station may provide, to the UE, specific indication information generated based on the specific subscription information received from the core network entity. A specific access indicator/identifier/differentiating factor may be assigned to the UE received the corresponding indication information. For example, this may be information for indicating a specific attribute of a UE. As another example, the specific indication information may be information for indicating a access category for unified access barring. When the specific indication information is configured, the NAS of a UE may provide indication information for network access to a lower layer (e.g., RRC)). When receiving the corresponding indication information, the AS of the UE may perform an access barring check operation for a specific category in accordance with the indication information according to system information. As another example, the NAS of the UE may receive a access barring parameter corresponding to a corresponding access category from a lower layer (e.g., RRC)). Further, access barring check may be performed for network access of the corresponding access category.

As another example, a specific access indicator/identifier/differentiating factor may be assigned based on specific indication information configured for a UE. A UE may be configured to provide a specific function. For example, the UE may be configured to contain the specific function in the USIM. An operator may assign a specific access indicator/identifier/differentiating factor to a UE received the specific indication information. When the UE is configured with the specific indication information, the NAS of the UE may provide the corresponding indication information to a lower layer (e.g., RRC)) upon performing access to a network. When the AS of the UE receives the corresponding indication information, the AS of the UE may perform an access barring check operation according to a specific access indicator/identifier/differentiating factor in accordance with the corresponding indication information according to system information. As another example, the NAS of the UE may receive a access barring parameter corresponding to a corresponding access category from a lower layer (e.g., RRC)). Further, an access barring check operation may be performed for network access of the corresponding access category.

As another example, an application identifier may be set to include an identifier for identifying an operator and another identifier for identifying a corresponding application within an operator. Alternatively, the application identifier may be set to identify an application by designating a range/group of identifiers which can be assigned by an operator.

The NAS of the UE may provide the corresponding application identification information to a lower layer (RRC) for network access. When the corresponding indication information is received, the AS of the UE may perform an access barring check for a specific category in accordance with the corresponding application indication information according to system information. As another example, the NAS of the UE may receive a access barring parameter corresponding to a corresponding access category from a lower layer (e.g., RRC)). Further, the access barring check may be performed for network access of the corresponding access category. As another example, the application layer of a UE may receive a access barring parameter corresponding to a corresponding access category from a lower layer (e.g., RRC). Further, the access barring check may be performed for network access of the corresponding access category.

As another example, access attempt in accordance with a specific application, a specific service, or a specific procedure may be assigned as a specific access category, and then the assigned information may be provided to a UE. For example, the corresponding access category may be provided to the UE by transmitting an NAS signaling message by a core network control plane entity to the UE. As another example, this may be provided to a UE through an RRC message by a base station. As further another example, this may be configured in advance in a UE. For example, an access attempt by a voice service may be provided to a UE as a service access category or configured in advance in the UE. An access attempt by a SMS service may be informed of a UE as another specific access category or configured in advance in the UE. An access attempt by transmission signaling may be instructed to a UE as another specific access category or configured in advance in the UE.

As another example, the NSA layer may transfer a unified access control category to the AS. The access category for the unified access control may be defined by an operator. For example, the category for the unified access control may be mapped and defined through any UE type, procedure type, service type, subscription information type, or combination thereof. The access category for the unified access control may be defined by standard specifications. For example, the category for the unified access control may be mapped and defined through any UE type, procedure type, service type, subscription information type, or combination thereof.

Unified access control may be performed in the RRC layer based on unified access control category information provided by the NAS. The RRC may perform access barring according to an access barring parameter for each access category broadcast system information. As another example, the NAS of a UE may receive a access barring parameter corresponding to a corresponding access category from a lower layer (e.g., RRC)). Further, the access barring check may be performed for network access of the corresponding access category.

An operator is required to map access attempt by a specific application or a specific service to an access control capable category and to configure the mapping result.

Barring configuration information (e.g., barring control information) for the unified access control may be provided by a network. For example, it may be provided through system information. It may be provided through minimum system information (Minimum SI). In the typical LTE technology, the configuration information for access control has been provided through a system information block type 2 (SystemInformationBlockType2). The system information block type 2 is broadcast by an SI message which is configurable and flexibleby scheduling information included in a system information block type 1 (SystemInformationBlockType1) other than a master information block (MasterInformationBlock) having a fixed period of 40 ms and transmitted over a BCH and the system information block type 1 (SystemInformationBlockType1) having a fixed period of 80 ms and transmitted over a DL-SCH. The NR capable of supporting a high frequency band includes two types of information which are minimum system information which is broadcast at a fixed period and enables a UE to receive always and other system information other than the minimum system information. The minimum system information is broadcast at a fixed period and includes basic information needed for initial access. The minimum system information includes two types of information which are the master information block (MasterInformationBlock) transmitted over a BCH and the system information block type 1 (SystemInformationBlockType1) transmitted over a DL-SCH. On the other hand, a period and scheduling information broadcast by the system information block type 1 (SystemInformationBlockType1) are provided by the other system information.

When barring configuration information for the unified access control is included in system information scheduled by the system information block type 1 as in the LTE, there may occur a problem that a UE is required to acquire other system information in an on-demand manner based on the minimum system information. Accordingly, it is necessary for barring configuration information for the unified access control to be included in the minimum system information, unlike the LTE, and taking into account a limitation over the BCH, it may be desirable that the barring configuration information for the unified access control is included in the system information block type 1 (SystemInformationBlockType1).

As another example, when requesting additional (other) system information based on the minimum system information (minimum SI), the requesting of additional (other) system information may be rejected by a base station. If a specific access category is not necessarily required, the barring configuration information for the unified access control may be provided through the additional system information.

As another example, the barring configuration information for the unified access control may be provided for only one or more specific categories through the minimum system information (minimum SI). In addition, barring configuration information of one or more other specific categories except for the barring configuration information for the one or more specific categories provided through the minimum system information may be provided through the additional (other) system information. For example, barring configuration information, which is associated with one or more standardized access categories by access attempt by a specific application, a specific service, or a specific procedure, may be provided through the minimum system information. As another example, barring configuration information, which is associated with one or more access categories which are assigned as a low index value and frequently used, may be provided through the minimum system information. As another example, barring configuration information, which is associated with one or more access categories by access attempt mapped to any UE type, procedure type, service type, subscription information type, or combination thereof by an operator, may be provided through the minimum system information. An another example, by being mapped to any UE type, procedure type, service type, subscription information type, or combination thereof by an operator, barring configuration information associated with one or more access categories for which corresponding information is additionally required to be configured/set in a UE and a base station may be provided through the minimum system information.

Meanwhile, a core network entity may designate, as a specific category, a specific UE, a specific application, a specific service, a specific procedure, specific subscription information, a specific QoS class mapping flow, a specific authority authentication confirmation, an RRC state, or a specific barring check layer, and transfer the designated category to the UE or the base station.

when the NAS layer indicates unified access category information and unified access barring configuration information is broadcast from a cell, the RRC of the UE performs unified access barring check. Otherwise, when access attempt is triggered by initiating a specific service, such as an emergency service etc., by the UE, the access barring check operation may be skipped. Information for this may be provided through system information, or configured in advance in the UE. Otherwise, the RRC of the UE performs the access barring check operation according to a default category classification.

Meanwhile, a category (e.g., an access identifier) for a specific UE can be defined by subscription information, and at the time of PDU session establishment, it may be instructed to the UE through signaling between a core network and the UE. As another example, an access category for a specific application/service (e.g., an access category) can be defined by subscription information, and at the time of PDU session establishment, it may be indicated to the UE through signaling between a core network and the UE. As another example, the information may be configured in advance in the UE.

The NAS layer of the UE may notify the AS layer of the received corresponding information. As another example, the AS of the UE may check the corresponding information when performing barring check.

When a UE performs initial access, if it is not a specific purpose access, a default access control may be performed. For example, the default access control may allow access barring check to be performed according to an access barring configuration when an access class of the USIM does not belong to a specific access category. As another example, the default access control may be configured by a network, and the network may instruct this to UE through system information. As further another example, the default access control may be configured in advance in a UE and may be provided in the same way as the ACB of the LTE. As yet another example, the default access control may be configured in advance in a UE, and parameters (a barring factor, a barring time, as a barring parameter for default access barring) for performing access barring check according to information configured (e.g., an access class) in the USIM of a UE may be provided to the UE by the network. The network may indicate, to a UE, barring parameters for a default access class through system information. The barring parameter information may include at least one of a barring factor, a barring time, and a barring bitmap. The network may indicate the barring parameter information to a UE.

Meanwhile, the core network entity may transmit, to a base station, authorization information as to whether to have authority corresponding to a specific access category received from a subscriber information server. This may be performed in initial access of the UE to the network. Thereafter, the UE may skip access barring for the specific access category. When skipping the access barring for the specific access category has not been authenticated, the UE may perform access barring according to a default access category. When a UE performs access without access barring checking although recognizing the corresponding authorization, the base station may reject an RRC connection request by distinguishing this. As another example, the base station may authenticate skipping access barring for a UE received the corresponding authorization.

As described above, a UE may perform respective access barring check operations based on an access category or access indicator/identifier/differentiating factor information. Here, the access category or access indicator/identifier/differentiating factor information may be indicated by a network, configured in advance in UE, or set by being associated with barring parameters, barring configuration information, or the like.

A Method of Manipulating Access Barring of a UE Corresponding to a Plurality of Access Control Categories or a Plurality of Access Indicators/Identifiers/Differentiating Factors A UE may be assigned as a plurality of access control categories or a plurality of access indicators/identifiers/differentiating factors according to an instruction of a network. As another example, a UE may be assigned as a plurality of access indicators/identifiers/differentiating factors according to a pre-configuration. When the UE assigned as a plurality of access indicators/identifiers/differentiating factors performs network access, the UE may perform an access barring check operation through at least one or more of the following methods.

For example, the UE may perform only access barring skip/omission check for one or more access indicators/identifiers/differentiating factors with a high priority of a plurality of access indicators/identifiers/differentiating factors. For example, the UE may check whether barring bitmap information corresponding to one or more access indicators/identifiers/differentiating factors with a high priority of a plurality of access indicators/identifiers/differentiating factors is set as a pre-set value, and skip/omit a barring check operation for corresponding access attempt when the barring bitmap information matches the pre-set value.

As another example, the UE may sequentially perform access barring skip/omission check of a plurality of access indicators/identifiers/differentiating factors according to priority among a plurality access indicators/identifiers/differentiating factors. For example, the UE may check whether barring bitmap information corresponding to access indicators/identifiers/differentiating factors according to priority among a plurality of access indicators/identifiers/differentiating factors is set as a pre-set value, and skip/omit the barring check operation for corresponding access attempt when the barring bitmap information matches the pre-set value. The UE may check whether barring bitmap information corresponding to one access indicator/identifier/differentiating factor of a plurality of access indicators/identifiers/differentiating factors is set as a pre-set value. When the barring bitmap information matches the pre-set value, the UE may not perform the operation of checking whether barring bitmap information corresponding to the remaining one or more access indicators/identifiers/differentiating factors is set as the pre-set value. That is, the access barring check operation may be skipped/omitted when at least one of the plurality of access indicators/identifiers/differentiating factors allows access barring check to be skipped/omitted through a corresponding barring bitmap.

As another example, the UE may perform only access barring skip/omission check for one or more access indicators/identifiers/differentiating factors with a low priority of a plurality of access indicators/identifiers/differentiating factors.

As another example, the UE may perform access barring skip/omission check for one access indicator/identifier/differentiating factor in a pre-assigned order among a plurality access indicators/identifiers/differentiating factors. The UE may check whether barring bitmap information corresponding to one access indicator/identifier/differentiating factor of a plurality of access indicators/identifiers/differentiating factors is set as a pre-set value. When the barring bitmap information matches the pre-set value, the UE may not perform the operation of checking whether barring bitmap information corresponding to the remaining one or more access indicators/identifiers/differentiating factors is set as the pre-set value. That is, the access barring check operation may be skipped/omitted when at least one of the plurality of accesses indicators/identifiers/differentiating factors allows access barring check to be skipped/omitted through a corresponding barring bitmap.

As another example, a base station dynamically indicates priority.

A Method of Applying Barring Parameters for Classified Category Groups

Category groups may be classified into three category groups: an allowance category group, a differential allowance category group, and a prohibit category group, and barring parameters in the differential allowance category group may be differentially applied.

For example, access barring may be performed by applying barring parameters for a specific access category and barring parameters for another specific access category through different information elements from each other.

For example, when access attempt is triggered for initiating a specific service, such as an emergency service etc., the UE may skip access barring check operation. Category information to this end may be provided through system information. As another example, the category information may be configured in advance. As another example, for the category to this end, it is necessary for a base station to receive authentication information from a core network entity and to recognize confirmation on this. As another example, for the category to this end, only when a UE receives authentication information from a core network entity and is authenticated for this, the UE may be allowed to skip/omit access barring check. For example, for a specific access category, by checking whether access is allowed to a corresponding access category through a barring bitmap (or 1 bit), the UE may be allowed to skip/omit access barring check through barring factor information, and/or barring time information.

As another example, in one or more of i) a case where the UE is configured to use a specific AC (e.g., AC 11-15), ii) a case where the UE replies a paging, and iii) a case where an RRC connection is established to an emergency call, the UE may be allowed to perform access without performing the specific access barring check. As another example, for any case configured by an operator, the UE may be allowed to perform access without performing a specific access barring check. For example, for a UE configured to use a specific AC (e.g., AC 11-15) in a selected PLMN, the UE may be allowed to perform access without performing the specific access barring check. As an example, for a specific access category, by checking whether access is allowed to a corresponding access category through a barring bitmap (or 1 bit), the UE may be allowed to skip/omit access barring check through barring factor information, and/or barring time information. For example, for a specific access indicator/identifier/differentiating factor, by checking whether access is allowed to a corresponding access category through a barring bitmap (or 1 bit), the UE may be allowed to skip/omit access barring check through barring factor information, and/or barring time information.

As another example, for a UE included in a specific access category in a differential allowance category, up to before receiving system information of a cell on the corresponding access category (or up to before receiving a system information with a valid version), the UE may be not allowed to initiate RRC connection establishment in the cell. A base station or a core network entity may indicate a corresponding access category to the UE. The base station or the core network entity may indicate, to the UE, information for indicating that RRC connection establishment shall not be initiated in the cell, up to before receiving system information of a cell on the corresponding access category. When a UE is configured with a corresponding access indicator/identifier/differentiating factor, or the UE is configured with, or indicated as, a corresponding access category, when the UE has not received system information with a valid version or enters into a corresponding cell, or the UE in an RRC idle state enters into the corresponding cell, it is necessary for the UE to initiate immediately to acquire system information on the corresponding access category. Alternatively, it is necessary for the UE to acquire system information on the corresponding access category and to perform access barring check in accordance with access attempt.

As another example, for a UE included in a specific access category, up to before receiving system information of a cell on the corresponding access category, the UE may not be allowed to initiate RRC connection establishment in the cell. A base station or a core network entity may indicate a corresponding access category to the UE. The base station or the core network entity may indicate, to the UE, information for indicating that RRC connection establishment shall not be initiated in the cell, up to before receiving system information of a cell on the corresponding access category.

As another example, in a state where a UE is not allowed to access according to access barring check, when network access is initiated based on an access category with a higher priority than an access category not allowing the UE to access, the UE may perform access barring check in accordance with the corresponding access category.

As another example, in a state where a UE is not allowed to access according to access barring check, when network access is initiated based on an access category with a lower priority than an access category not allowing the UE to access, the UE may consider the corresponding access category not to be allowed to access as well.

As another example, in a state where a UE is not allowed to access according to access barring check, when network access is initiated based on an access category with a lower priority than an access category not allowing the UE to access, the UE may start or restart an access barring timer due to access for the corresponding access category.

A Method of Instructing a Barring Layer

For access control of a specific category through unified access control operation, a base station may instruct a barring layer (e.g., AS(RRC), NAS) performing access barring for the specific access category.

For example, the barring layer may be instructed (e.g., informed) through system information. For example, the barring layer may be provided through minimum system information (minimum SI). As another example, when requesting additional (other) system information based on the minimum system information (minimum SI), the requesting of additional (other) system information may be rejected by a base station. As another example, the barring layer may be informed for one or more specific categories through the minimum system information (minimum SI). As another example, the barring layer may be instructed for one or more other specific categories through the additional (other) system information.

As another example, for distinguishing layers performing access barring, barring layer indication information may be instructed by including a value for distinguishing an application layer (or a higher layer, an IMS layer, an application layer defined in the 3GPP, or an application/service defined in the 3GPP).

For example, when barring information (e.g., barring configuration information) for unified access barring is broadcast in a cell, and barring layer indication information indicates the AS layer (or RRC), the RRC of a UE applies access barring check operation. As another example, when barring information for unified access barring is broadcast in a cell and when barring layer indication information for a specific access category is provided to the AS layer (or RRC), the RRC of a UE applies access barring check operation for the corresponding access category. For example, when the NAS initiates network access, the NAS may notify the RRC of indication information on a corresponding category. The RRC may perform access barring check operation based on information indicated by the NAS.

For example, when barring information for unified access barring is broadcast in a cell and when barring layer indication information is provided to the NAS layer, the NAS of a UE applies access barring check operation. For example, when barring information for unified access barring is broadcast in a cell and when barring layer indication information for a specific access category is provided to the NAS layer, the NAS of a UE applies access barring check operation for the corresponding access category. For example, when barring information for unified access barring is broadcast in a cell and when barring layer indication information for a specific access category is provided to the NAS layer, the AS layer (or RRC) of a UE may notify the NAS of this. When initiating network access, the NAS applies access barring check operation for a corresponding access category.

When network access is barred according to access barring check operation, the NAS may notify the NAS of this. In a state where network access is barred according to access barring check in the NAS, when the AS receives changed access barring configuration information (or an access barring parameter or a corresponding access barring parameter) according to a change in system information, the AS may notify the NAS of this.

For example, when barring information for unified access barring is broadcast and when barring layer indication information indicates the application layer, the application layer of a UE applies access barring check operation. As another example, when barring information for unified access barring is broadcast in a cell and when barring layer indication information for a specific access category is provided to the application layer, the application layer of a UE applies access barring check operation for the corresponding access category. For example, when barring information for unified access barring is broadcast in a cell and when barring layer indication information for a specific access category is instructed to the application layer, the AS layer (or RRC) of a UE may notify the application layer of this. When initiating network access, the application layer (or higher layer, or IMS layer) applies access barring check operation for a corresponding access category. When network access is barred according to access barring check operation, the application layer may notify the AS of this. In a state where network access is barred according to access barring check operation in the application layer, when the AS receives changed access barring configuration information (or an access barring parameter or a corresponding access barring parameter) according to a change in system information, the AS may notify the application layer of this.

Meanwhile the UE may assign and configure an access category according to a layer in which access barring check is performed. An access category for which access barring check is performed in the AS may be configured separately from an access category for which access barring check is performed in the NAS. To this end, an access barring parameter for each access category may be configured.

A Method of Configuring an Access Barring Category for RRC Connected Mode Operation Basically, performing access barring for a UE in an RRC connected state may have a negative effect on user communication quality. Accordingly, it may be desirable to release the RRC connection or adjust load through scheduling. However, when signaling for releasing the RRC connection is unsuitable or not available, access barring may be inevitably performed through system information.

In this case, a base station may broadcast indication information for enabling access barring to be provided according to access categories distinguished according to a specific application, a specific service, a specific procedure, specific subscription information, or a specific QoS class mapping flow.

When information for indicating access barring is present according to an access category for a specific application, a specific service, a specific UE configuration, or a specific QoS flow in the RRC connected state, a UE sets it as a barring parameter. For example, the information for indicating access barring may be transferred to a higher layer initiating a corresponding application or service. The higher layer performs access barring check operation. This manipulation may be equally applied to embodiments described below. As another example, the information for indicating access barring is transferred to a layer 2 entity (performing QoS flow and data radio bearer mapping, QoS flow ID (QFI) marking in UL and DL packets, or the like) processing data mapped to a specific UE configuration or a specific QoS flow (to a QoS flow distinguished by parameters, such as a 5G QoS Identifier, or allocation and retention priority), in the RRC connected state. Such an entity may be a PDCP entity or an entity (a service data adaptation protocol (SDAP) manipulating QoS over the PDCP. The layer 2 entity may perform access barring check operation in the AS, as described above. When access is barred, an UL transmission procedure through a corresponding cell cannot be initiated or barred. As another example, when corresponding UL data or DL data are received, this may be indicated to the RRC, and access barring check may be performed in the RRC. As another example, when corresponding UL data or DL data are received, a corresponding access category may be indicated to the RRC, and access barring check may be performed in the RRC. As another example, when corresponding UL data or DL data are received, a corresponding access category may be instructed to the NAS, and access barring check may be performed in the NAS. The RRC may perform access barring check.

A Method of Configuring an Access Barring Category for RRC Inactive Mode Operation Three UE modes/states are supported in the NR. That is, an RRC inactive mode is supported, in addition to the RRC IDLE and the RRC connected of the LTE. The RRC inactive state supports at least one of the following functions.

Cell re-selection mobility;

CN-NR RAN connection (both C/U-planes) has been established for UE;

The UE AS context is stored in at least one gNB and the UE;

Notification is initiated by NR RAN;

RAN-based notification area is managed by NR RAN;

NR RAN knows the RAN-based notification area which the UE belongs to;

The RRC inactive state is required to provide a power consumption level similar to RRC idle state. However, the RRC inactive state may be considered as a sub-state of the RRC connected state. Or, the RRC inactive state may be used for transmitting delay tolerant small data. A UE enters the RRC inactive state through dedicated signaling. Accordingly, a specific category may be assigned to an inactive UE or an inactive UE of a specific group to configure a access barring category. This may be instructed by a base station through system information or instructed by being included together when instructing a UE to transition to the RRC inactive state through dedicated signaling.

For example, an access category distinguished from the RRC idle may be configured for an RRC inactive state UE, and access barring check operation may be performed for the configured access category. To this end, an access barring parameter for the corresponding access category may be configured. As another example, an access category distinguished from the RRC idle may be configured for an RRC inactive state UE indicated as a specific category, and access barring check operation may be performed for the configured access category. To this end, an access barring parameter for the corresponding access category may be configured.

For example, the RRC inactive state UE may have a procedure initiated in the RRC, like an RAN notification area (RNA) update procedure. This may occur when, in the RRC IDLE state UE, the NAS does not recognize it, unlike the procedure initiated by a higher layer. Accordingly, for a specific access attempt of the RRC inactive state UE, an access category distinguished from an access category initiated by an access attempt of the RRC idle UE may be configured, and access barring check operation may be performed for the configured access category. To this end, an access barring parameter for the corresponding access category may be configured. As another example, an access category distinguished from the RRC idle may be configured for an RRC inactive state UE performing access attempt by a procedure indicated as a specific category, and access barring check operation may be performed for the configured access category. To this end, an access barring parameter for the corresponding access category may be configured. The above described operation may be used for this operation.

As another example, when an RRC inactive state UE moves, access barring of a cell to which the UE has moved may be configured differently from access barring of an anchor base station cell. In this case, an RRC connection establishment in the cell may not be initiated up to before receiving system information from a new serving cell for satisfying access barring of the new serving cell. As another example, for a specific access category, an RRC connection establishment in the cell may not be initiated up to before receiving system information of the cell.

A Method of Configuring an Access Barring Category According to a Network Slice

The network slicing is a technology for improving flexibility by dividing a network into multiple types of virtual networks using network virtualization technologies and configuring a separate logical network for each service or subscriber. With network slicing, a needed resource may be allocated from a virtualized network resource pool according to a service type. Therefore, when a new service is introduced, it is possible to provide the service rapidly without a physical network established, and to use efficiently limited physical network resources. Thus, the network slicing enables a logical network to be implemented in an infrastructure shared among multiple network slices, compared with establishing an independent network slicing infrastructure.

The NR can configure an access category based on slice information (a slice type, a tenant type, a slice ID, a slice service, slice information, slice configuration information, slice characteristic information, an RAN function of a slice, an RAN function list of a slice, or network slice selection assistance information (NSSAI), for convenience of description, hereinafter, referred to as slice information), and perform access barring check.

For example, an access category mapped to specific slice information may be configured. To this end, an access barring parameter for the corresponding access category may be configured. As another example, an access category for a UE using a slice assigned as a specific category may be configured, and access barring check may be performed for the configure access category. To this end, an access barring parameter for the corresponding access category may be configured. When the AS performs access barring check for a network slice assigned as the corresponding access category, a higher layer may indicate associated slice information or access category information to the AS (RRC) for network access.

When On-Demand System Information is Requested, a Method of Rejecting the Request When a network is overloaded, a base station may wish to bar access for a specific access category. Information for instructing to bar access for a specific access category for barring may be included in the minimum system information (minimum SI). For a specific access category (e.g., an access category by the defining of an operator) for differentially allowing access for other access categories, corresponding information may be included in on-demand SI information. When a UE requests the on-demand SI, a base station may reject to provide on demand system information. For example, the base station may include an access barring factor, barring time, or barring bitmap for access barring check for the on-demand system information. A UE performs access barring check. The various embodiments herein may be applied for the barring check operation without any limitations. As another example, for the request of the on-demand system information of the UE, a value of a back-off timer may instructed. The UE initiates the back-off timer, and while the back-off timer runs, does not attempt on-demand SI request or UL transmission. Or, the UE stops or suspends the UL transmission.

Barring Configuration Information

A network may indicate information for configuring a specific access category to a UE.

For example, this may be instructed to the UE by a core network control plane entity through an NAS signaling message. As another example, this may be instructed to the UE by a base station through an RRC message.

The network may provide, to the UE, information for dedicating a specific UE, a specific application, a specific service, a specific procedure, specific subscription information, a specific QoS class mapping flow, a specific authority authentication confirmation, a specific RRC state, a specific access barring check layer, a specific PLMN, a specific network slice, or a combination thereof as a specific access category or access indicator/identifier/differentiating factor.

In a state where the UE have received such information, when receiving information for indicating access barring for a corresponding access category through system information, the UE may perform access barring using a barring parameter assigned in the corresponding access category. The information for indicating the corresponding access category may include associated barring configuration information. For example, this may include information for indicating a specific UE, a specific application, a specific service, a specific procedure, specific subscription information, a specific QoS class mapping flow, a specific authority authentication confirmation, a specific RRC state, a specific access barring check layer, a specific PLMN, a specific network slice, or a combination of at least two of the above examples, for an access category.

As another example, when information for indicating access barring for a corresponding access category through system information is received, access barring check may be performed over an access barring check layer included in the corresponding access category.

As another example, when information for indicating access barring for a corresponding access category through system information is received, access barring check may be performed in the RRC state included in the corresponding access category.

As another example, when information for indicating access barring for a corresponding access category through system information is received, a UE configured with subscription information included in the corresponding access category may perform access barring check.

As another example, when information for indicating access barring for a corresponding access category through system information is received, when access is initiated for a specific application, a specific service, a specific procedure, or a specific QoS class mapping flow included in the corresponding access category, the RRC layer may perform access barring check.

As another example, when information for indicating access barring for a corresponding access category through system information is received, when a corresponding access barring parameter is indicated according to an UE configuration included in the corresponding access category, the corresponding UE may skip/omit access barring check by comparing a barring bitmap.

As another example, barring configuration information indicated by a base station to a UE through system information may include at least one of a barring category, a barring layer and a barring parameter.

As another example, barring configuration information indicated by a network to a UE may include at least one of a barring category, a barring layer and a barring parameter. In addition to this, barring identification information/index may be indicated. For example, at least one of an object to be barred, a barring layer and a barring parameter with a specific configuration/value may be configured through the barring identification information.

FIG. 4 is a diagram illustrating an example of access barring parameter information for each access category according to embodiments of the present disclosure.

Referring to FIG. 4, at least one of the following parameters below may be selectively used.

Uab-category: represents information for indicating an access category of a UE, to which access barring is applied.

Uab-BarringBitmap: for access attempt indicated to a corresponding access category, for each corresponding access indicator/identifier/differentiating factor for an access indicator/identifier/differentiating factor according to a configuration of a UE, a first/leftmost bit of information for indicating omission/skip of access barring check/AS barring check omission/skip by a barring factor and a barring time/access allowance for access attempt of a UE with a corresponding access identifier/allowance of access attempt to which access is controlled (barred)/access attempt allowance/override for access barring/access control skip is for a first access indicator/identifier/differentiating factor, and a second bit thereof is for a second access indicator/identifier/differentiating factor.

Uab-Barringfactor: represents a barring factor for access check. For example, the UE may extract a random number for access barring check, compare the number with a barring factor, and perform access control based on the comparing result.

Uab-BarringTime: represents a time in which barring is performed when barring is performed at access check.

Barring ID: represents identification information/index for distinguishing a barring configuration. A UE may be indicated to have identical barring configuration information/barring parameter(s) for access categories each different from another through an identical barring ID.

Uab-priority: represents a priority class or priority indication information for access barring processing.

Through this, barring configuration information mapped to a specific access category may be distinguished through an barring ID.

A Method of Instructing an Access Barring Order or Priority

When multiple access barring technologies are used in the LTE technology, the order of multiple access barring checks is fixed. That is, access barring is checked in order of SS AC->EAB->ACDC->ACB skip->ACB. In the NR, in order to apply flexible access barring, when applying multiple access barrings or when applying access barring for multiple access categories or multiple access indicators/identifiers/differentiating factors, the order of barring checks may be indicated.

For example, barring bitmaps may be checked in ascending order of the access indicator/identifier/differentiating factor. As another example, barring bitmaps may be checked in descending order of the access indicator/identifier/differentiating factor.

As another example, a base station may provide information for the order of access barring to a UE so that barring check operation can be performed for the UE configured with an access barring category and/or access barring prohibition of an application layer for a specific application in order of an access barring category, an access barring category for another specific application, an access category in which access barring is always allowed without the performing of access barring, and a default access barring category.

In this case, related operations are as follows. It should be considered that the following operations are for convenience of description; therefore, the order of operations can be changed. For example, access barring check may be preferentially performed for an access category that is always allowed.

At first, access barring is performed for an access barring category of an application layer for a specific application.

In response to the request of the application layer (or a higher layer or the IMS layer), when an SSAC barring parameter for MMTEL audio/video is present, a UE sets it as a barring parameter for SSAC audio/video. Then, this is transferred to the application layer (or the higher layer or the IMS layer). Specific description for this is as follows.

In response to a request from the higher layer, the UE may perform the following operations according to whether a condition is satisfactory.

For example, if SystemInformationBlockType2 includes ac-BarringPerPLMN-List and the ac-BarringPerPLMN-List contains an AC-BarringPerPLMN entry with the plmn-IdentityIndex corresponding to the PLMN selected by higher layers, a UE selects the AC-BarringPerPLMN entry with the plmn-IdentityIndex corresponding to the PLMN selected by higher layers. Alternatively, in the remainder of this procedure the UE uses the selected AC-BarringPerPLMN entry (i.e. presence or absence of access barring parameters in this entry) irrespective of the common access barring parameters included in SystemInformationBlockType2.

As another example, if SystemInformationBlockType2 includes ac-BarringPerPLMN-List and the ac-BarringPerPLMN-List does not contain an AC-BarringPerPLMN entry with the plmn-IdentityIndex corresponding to the PLMN selected by higher layers, in the remainder of this procedure, the UE uses the common access barring parameters (i.e. presence or absence of these parameters) included in SystemInformationBlockType2).

As further another example, the UE sets the local variables BarringFactorForMMTEL-Voice and BarringTimeForMMTEL-Voice as follows. If ssac-BarringForMMTEL-Voice is present, if the UE has one or more Access Classes, as stored on the USIM, with a value in the range 11 . . . 15, which is valid for the UE to use according to TS 22.011 and TS 23.122, and if, for at least one of these Access Classes, the corresponding bit in the ac-BarringForSpecialAC contained in ssac-BarringForMMTEL-Voice is set to zero, the UE sets BarringFactorForMMTEL-Voice to one and BarringTimeForMMTEL-Voice to zero.

Alternatively, if the UE does not have one or more Access Classes, as stored on the USIM, with a value in the range 11 . . . 15, which is valid for the UE to use according to TS 22.011 and TS 23.122, and if, for at least one of these Access Classes, the corresponding bit in the ac-BarringForSpecialAC contained in ssac-BarringForMMTEL-Voice is not set to zero, the UE sets BarringFactorForMMTEL-Voice and BarringTimeForMMTEL-Voice to the value of ac-BarringFactor and ac-BarringTime included in ssac-BarringForMMTEL-Voice, respectively. If ssac-BarringForMMTEL-Voice is not present, the UE sets BarringFactorForMMTEL-Voice to one and BarringTimeForMMTEL-Voice to zero.

As yet further another example, the UE sets the local variables BarringFactorForMMTEL-Video and BarringTimeForMMTEL-Video as follows. If ssac-BarringForMMTEL-Video is present, if the UE has one or more Access Classes, as stored on the USIM, with a value in the range 11 . . . 15, which is valid for the UE to use according to TS 22.011 and TS 23.122, and if, for at least one of these Access Classes, the corresponding bit in the ac-BarringForSpecialAC contained in ssac-BarringForMMTEL-Video is set to zero; the UE sets BarringFactorForMMTEL-Video to one and BarringTimeForMMTEL-Video to zero. Alternatively, if the UE does not have one or more Access Classes, as stored on the USIM, with a value in the range 11 . . . 15, which is valid for the UE to use according to TS 22.011 and TS 23.122, and if, for at least one of these Access Classes, the corresponding bit in the ac-BarringForSpecialAC contained in ssac-BarringForMMTEL-Video is not set to zero, the UE sets BarringFactorForMMTEL-Video and BarringTimeForMMTEL-Video to the value of ac-BarringFactor and ac-BarringTime included in ssac-BarringForMMTEL-Video, respectively. If ssac-BarringForMMTEL-Video is not present, the UE sets BarringFactorForMMTEL-Video to one and BarringTimeForMMTEL-Video to zero.

As yet further another example, the UE forwards the variables BarringFactorForMMTEL-Voice, BarringTimeForMMTEL-Voice, BarringFactorForMMTEL-Video and BarringTimeForMMTEL-Video to the higher layers.

Thereafter, access barring is performed for the access barring category in the UE configured with access barring check.

If the UE is configured with EAB, the NAS (e.g., EMM) indicates the applying of the EAB to the request for the purposes of access control to a lower layer (e.g., RRC).

If system information includes an EAB parameter, if a corresponding bit is set as one in EAB barring bitmaps for one or more Access Classes, as stored on the USIM, with a value in the range 0 . . . 9, which is valid for the UE to use according to TS 22.011 and TS 23.122, and TS 23.122, the UE considers the corresponding cell as barred. If not, the UE considers the cell as not barred due to EAB. Specific description for this is as follows.

If SystemInformationBlockType14 is present and includes the eab-Param, if the eab-Common is included in the eab-Param, if the UE belongs to the category of UEs as indicated in the eab-Category contained in eab-Common, if for the Access Class of the UE, as stored on the USIM and with a value in the range 0 . . . 9, the corresponding bit in the eab-BarringBitmap contained in eab-Common is set to one, the UE considers access to the cell.

Alternatively, if the UE does not belong to the category of UEs as indicated in the eab-Category contained in eab-Common, if for the Access Class of the UE, as stored on the USIM and with a value in the range 0 . . . 9, the corresponding bit in the eab-BarringBitmapcontained in eab-Common is not set to one, the UE considers access to the cell as not barred due to EAB.

If the eab-Common is not included in the eab-Param, and the eab-PerPLMN-List is included in the eab-Param, the UE selects the entry in the eab-PerPLMN-List corresponding to the PLMN selected by higher layers. If the eab-Config for that PLMN is included, if the UE belongs to the category of UEs as indicated in the eab-Category contained in eab-Config; and if for the Access Class of the UE, as stored on the USIM and with a value in the range 0 . . . 9, the corresponding bit in the eab-BarringBitmap contained in eab-Config is set to one, the UE considers access to the cell as barred.

Alternatively, if the eab-Config for that PLMN is included, if the UE does not belong to the category of UEs as indicated in the eab-Category contained in eab-Config; and if for the Access Class of the UE, as stored on the USIM and with a value in the range 0 . . . 9, the corresponding bit in the eab-BarringBitmap contained in eab-Config is not set to one, the UE considers access to the cell as not barred due to EAB.

If the eab-Common is not included in the eab-Param, and the eab-PerPLMN-List is included in the eab-Param, if the eab-Config for that PLMN is not included, the UE considers access to the cell as not barred due to EAB.

If SystemInformationBlockType14 is present and does not include the eab-Param, the UE considers access to the cell as not barred due to EAB).

Thereafter, access barring is performed for an access barring category for another specific application. The ACDC is performed as follows.

If the UE supports ACDC, the EMM layer shall determine the ACDC category applicable to the request based on the application identifier received from the higher layers and the configuration information in the "ACDCConf" leaf of ACDC MO as specified in 3GPP TS 24.105 or in the USIM EFACDC as specified in 3GPP TS 31.102. As an implementation option, the higher layers can determine the ACDC category and send it to the EMM layer. Then the EMM layer need not read the ACDC MO or USIM to determine the ACDC category.

i) If only one ACDC category is applicable for access control, an ACDC category applicable to this request, ii) if a plurality of ACDC categories is applicable for access control, an ACDC category of the highest rank of the ACDC categories applicable to this request, or iii) if one application identifier received from higher layers is not mapped to any ACDC category, the NAS (or EMM) layer instructs, to a lower layer (or RRC), that this request is an application which is not distinguished, If the UE supports the ACDC, if access is barred due to the ACDC, the NAS layer tracks the ACDC category to which access is barred until the access is allowed. The NAS layer shall not transmit a request for an identical ACDC category or a lower ACDC category.

If the UE supports the ACDC, if access is barred due to the ACDC, the NAS layer shall not transmit a request for any uncategorized application until the access is allowed.

If RRC connection is subject to ACDC and system information includes an ACDC category, the higher layer performs access barring check for the ACDC.

For the ACDC, the higher layer receives RRC connection reject first, and checks whether the T302 timer runs. Otherwise, if the system information includes ACDC barring parameters, one random number is derived, and if the random number is less than ac barring factor included in ACDC barring parameters, the cell is considered as not barred. Otherwise, the cell is considered as barred If the cell is barred, and the T302 does not operate, one random number is derived, the Tbarring timer is calculated and started using the random number. Specific protocols for this are as follows.

The UE shall:

---

1>if upper layers indicate that the RRC connection is subject to ACDC, SystemInformationBlockType2 contains BarringPerACDC-CategoryList, and acdc-HPLMNonly indicates that ACDC is applicable for the UE:
  2>if the BarringPerACDC-CategoryList contains a BarringPerACDC-Category entry corresponding to the ACDC category selected by upper layers:
    3> select the BarringPerACDC-Category entry corresponding to the ACDC category selected by upper layers;
  2> else:
    3> select the last BarringPerACDC-Category entry in the BarringPerACDC-CategoryList;
  2> stop timer T308, if running;
  2> perform access barring check as specified in 5.3.3.13, using T308 as "Tbarring" and acdc-BarringConfig in the BarringPerACDC-Category as "ACDC barring parameter";
    2> if access to the cell is barred:
    3> inform upper layers about the failure to establish the RRC connection or failure to resume the RRC connection with suspend indication and that access barring is applicable due to ACDC, upon which the procedure ends;

-continued

1>if timer T302 is running:
  2> consider access to the cell as barred;
1>else if SystemInformationBlockType2 includes "ACDC barring parameter":
  2> draw a random number 'rand' uniformly distributed in the range: 0 ≤ rand < 1;
  2> if 'rand' is lower than the value indicated by ac-BarringFactor included in "ACDC barring parameter":
    3> consider access to the cell as not barred;
  2> else:
    3> consider access to the cell as barred;
1>else:
  2> consider access to the cell as not barred;
1>if access to the cell is barred and timer T302 is not running:
  2> draw a random number 'rand' that is uniformly distributed in the range 0 ≤ rand < 1;
  2> start timer "Tbarring" with the timer value calculated as follows, using the ac-BarringTime included in "ACDC barring parameter":

---

"$T\text{barring}$"=$(0.7+0.6*rand)*ac\text{-BarringTime}$.

Thereafter, access barring is performed for an access category for which access is always allowed without the performing of access baring. For example, when the UE establishes an RRC connection for voice/SMS, the ACB is skipped as follows.

For example, 1> else if the UE is establishing the RRC connection for mobile originating MMTEL voice, mobile originating MMTEL video, mobile originating SMSoIP or mobile originating SMS:

---

2> if the UE is establishing the RRC connection for mobile originating MMTEL voice and SystemInformationBlockType2 includes ac-BarringSkipForMMTEL Voice; or
  2> if the UE is establishing the RRC connection for mobile originating MMTEL video and SystemInformationBlockType2 includes ac-BarringSkipForMMTELVideo; or
  2> if the UE is establishing the RRC connection for mobile originating SMSoIP or SMS and SystemInformationBlockType2 includes ac-BarringSkipForSMS:
    3> consider access to the cell as not barred;

---

Finally, checks access barring for a default access barring category. For example, access barring is checked according to an RRC connection establishment cause (establishmentCause).

A Method of Identifying Application/Service Through QoS Indication Information

In the NR, reflective QoS may be supported through the RAN under control of a network. When the network determines QoS to be applied to DL traffic, a UE reflects DL QoS to associated UL traffic. When the UE receives a DL packet to which the reflective QoS is applied, the UE generates a new QoS rule. A packed filter in the induced QoS rule is induced from a DL packet (a header of a packet).

In the NR, a default QoS rule is provided to the UE when a PDU session is established. In the NR, when a PDU session is revised, the revised QoS rule is provided to the UE. In the NR, a pre-authenticated QoS rule is provided to the UE when a PDU session is established. When PDU session is established or PDU session is revised, an NAS level QoSprofile of the QoS rule may be transferred to the RAN through NG2 signaling using a radio network. The QoS rule is formed of an NAS level QoS profile, a packet filter, and a precedence order. The QoS rule may further include at least one of information for distinguishing a QoS flow ID, an application identifier, and a specific application/service/flow.

A QoS rule signaled to a UE connected through the NG RAN based on 3GPP access is provided through NG1 signaling.

When PDU session is established or revised, an application/service may be distinguished in association with the QoS rule (or QoS flow ID, or QoS indication information, or QoS associated application/service distinction information, for convenience of description, hereinafter, referred to as "QoS rule") or the QoS. For example, a QoS recognition application may indicate a requested QoS using DSCP marking. An application/service associated with the QoS may be identified using a packet filter including the DSCP marking.

This may be a default QoS rule provided to the UE when the PDU session is established, or be a pre-authenticated QoS rule provided to the UE when the PDU session is established. As another example, this may be a QoS rule configured in advance for the UE, or be provided to the UE USIM through OTA. As another example, this may be a default QoS rule provided to the UE when a previous PDU session has been, or was, established, or be a pre-authenticated QoS rule provided to the UE when a previous PDU session has been, or was, established.

Based on QoS information (e.g., QoS flow ID marking information, QoS flow information etc.) provided from a base station or received from the base station, the UE may identify access category information of application/service/traffic/flow corresponding to this. When establishing or revising a PDU session, based on a QoS rule (e.g., a QoS flow ID, a QoS flow and radio bearer mapping information) indicated from a base station or received from the base station, the UE may distinguish access category information of application/service/traffic/flow corresponding to this. The UE may perform access barring check operation in accordance with a corresponding access category for network access from the access category in accordance with access attempt of a corresponding application/service/traffic/flow.

For example, the access barring check operation may be instructed from a layer 2 entity (SDAP entity) which manipulates QoS in the PDCP entity or over the PDCP. For example, the layer 2 entity may perform the access barring check operation in the AS, as described above. When access is barred, the UE does not perform or interrupts UL data transmission through a corresponding cell according to a barring parameter associated with a corresponding access category. As another example, when a corresponding L2 entity receives UL data or DL data to be transmitted, the L2 entity may indicate this to the RRC. The RRC may perform access barring check according to a barring parameter associated with a corresponding access category. As another example, when the L2 entity receives UL data or DL data to be transmitted, the L2 entity may instruct a corresponding access category to the RRC. The RRC may perform access barring check. As another example, an access category corresponding to establishment and revision of an associated PDU session corresponding to a QoS rule may be indicated from the NAS to the RRC. Further, the RRC may perform access barring check according to an access barring parameter associated with the corresponding access category. As another example, the NAS may indicate a corresponding access category to the RRC according to access attempt corresponding to establishment and revision of an associated PDU session corresponding to a QoS rule. Further, the RRC may perform access barring check according to an access barring parameter associated with the corresponding access category.

As another example, access barring check operation may be applied to an RRC connection state UE. As further another example, an RRC idle state or RRC inactive UE may perform access barring through a previous UC context or previous UE connection information.

As described above, in accordance with embodiments of performing various operation and transmitting/receiving various information, a UE may perform unified access control operation, and determine whether to perform access barring check operation according to various categories through relatively a small amount of signaling. In addition, in accordance with embodiments of the present disclosure, using a unified access barring method, it is possible to provide an effect of effectively performing congestion control according to various usages and scenarios.

Hereinafter, configurations of a UE and a base station for performing embodiments of the present disclosure described above will be discussed with reference to embodiments described in FIG. 2. In addition to FIG. 2, the above-described individual embodiments may be performed by both the UE and the base station described below.

Figure 5:
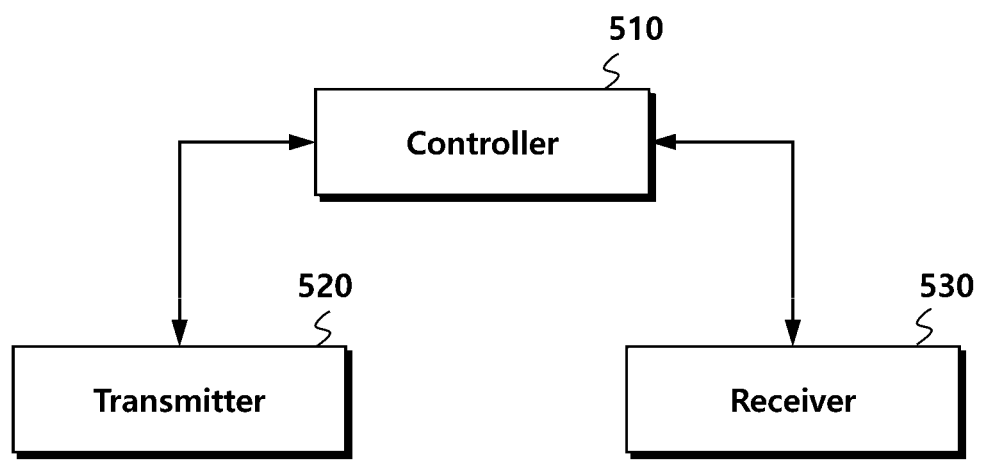
FIG. 5 is a block diagram illustrating the user equipment according to embodiments of the present disclosure.

FIG. 5 is a block diagram illustrating a user equipment according to embodiments of the present disclosure.

Referring to FIG. 5, a UE 500 performing an unified access control may include: a receiver 530 configured to receive system information including information for access control from a base station, and a controller 510 configured to control an non access stratum (NAS) layer of the user equipment to instruct access category information to an access stratum (AS) layer when an access attempt is triggered, and checking whether access barring parameter information is included in the system information, and control an access barring check in the AS layer using at least one of the access category information and the access barring parameter information.

For example, the receiver 530 may receive the system information broadcast by the base station. The system information may include the information of access control. As one example, the information for access control may include at least one of access barring parameter information and barring configuration information. The access barring parameter information may be included in the access barring configuration information, and may include parameters that are necessary for the UE to perform an access barring check operation. As another example, the information for access control may be received by being included in minimum system information of the system information. As further another example, the information for access control may be received by being included in other system information. The receiver 530 may receive the system information periodically or every when a specific event occurs.

When access attempt is triggered by an internal process, the controller 519 controls the NAS layer of the UE to provide access category information to the AS layer. For example, the access category information may be set for each access attempt type that is classified based on a type of application service of the UE. As another example, the access category information may be set for each access attempt type that is classified based on a transmission signaling processing procedure of the UE. As further another example, the access category information may be set for each access attempt type that is classified based on a transmission signaling processing procedure and an access attempt type of the UE. That is, the access category information includes information classified based on a pre-set criterion according to an access processing procedure of the UE. Meanwhile, the access category information may be configured in advance in the UE and the base station. The access category information may be transmitted by the base station to the UE. The access category information may be variously set by an operator managing the base station, and there is no limitation thereto.

When the access category information is instructed from the NAS layer, and the access attempt is triggered, the controller 510 may identify whether the access barring parameter information is included in the system information. Here, the access barring parameter information may be set in association with UE configuration information of the UE. For example, the access barring parameter information may be set for each UE configuration information of the UE, and received through the system information. As another example, the access barring parameter information may be set in association with the access category information. For example, the access barring parameter information may be set equally or differently for each access category information. As another example, one barring parameter information may be set in association with a plurality of access category information. As another example, the access barring parameter information may be set in association with both UE configuration information of the UE and the access category information.

Meanwhile, the access barring parameter information may be included in specific information of barring configuration information for each access category information. That is, the access barring parameter information may be included in the barring configuration information that is set for each access category information, and then received to the UE.

The barring configuration information may include at least one of barring identification information, barring factor information, barring time information and barring bitmap information according to configuration information of a UE. For example, the barring according to a pre-set criterion. The barring factor information may include a ratio value for random barring. For example, the controller 510 may extract a random number, compare the number with a barring factor, and perform access control based on the comparing result. The barring time information may include time information, such as a timer related to barring of a UE, or the like. The barring bitmap information may be used to determine whether the UE skips the barring check operation by comparing the barring bitmap information with corresponding UE configuration information.

When access attempt is triggered, the controller 510 may perform the access barring check operation in the AS layer. For example, the controller 510 may determine whether to perform the barring check operation in a corresponding access category using access category information and barring configuration information (including barring parameter information) indicated by the AS layer. More specifically, when the access category information indicates an emergency communication, the controller 510 may skip the barring check operation.

As another example, the controller 510 may determine whether to perform the barring check operation using pre-set UE configuration information and barring parameter information. More specifically, the controller 510 may check whether corresponding barring bitmap information in accordance with UE configuration information is set as a pre-set value, and when the barring bitmap information matches the pre-set value, skip barring check operation for corresponding access attempt. In this case, the UE configuration information may be determined as one of access classes 11, 12, 13, 14 and 15.

Normally, in case the UE configuration information includes access class information, one UE configuration information may be set for each UE. It should be considered that one or more access class information may be set for each UE. In this case, the UE may skip access barring check operation when at least one of an access class or one or more UE configurations allows to skip access barring check.

In addition, the controller 510 controls the overall operation of the UE 500 to manage and perform integrally access control in the next generation mobile communication network, which is needed to perform the embodiments described above.

In addition, the transmitter 520 and the receiver 530 are used to transmit or receive signals, messages, data required to perform embodiments described above to or from a core network entity or a base station.

Figure 6:
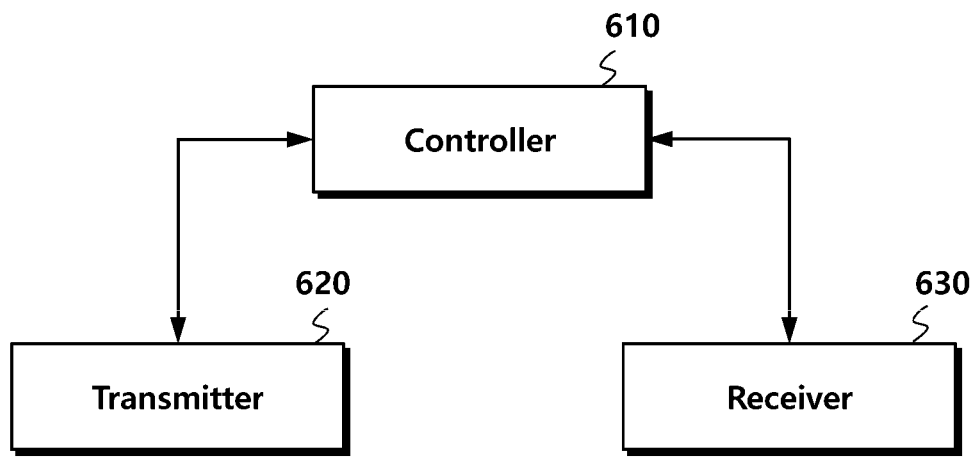
FIG. 6 is a block diagram illustrating the base station according to embodiments of the present disclosure.

FIG. 6 is a block diagram illustrating a base station according to embodiments of the present disclosure.

Referring to FIG. 6, a base station 600 controlling an unified access control operation may include: a controller 610 configured to generate information for access control including at least one of access barring parameter information and barring configuration information, a transmitter 620 configured to include the information for access control in system information and transmit the system information including the information for access control to the user equipment, and a receiver 630 configured to receive access request information by the user equipment determined based on the system information.

For example, the controller 619 may generate information for controlling an access barring operation of a UE.

As one example, the information for access control may include at least one of access barring parameter information and barring configuration information. The access barring parameter information may be included in the access barring configuration information, and may include parameters that are necessary for the UE to perform an access barring check operation. As another example, the access barring parameter information may be set in association with UE configuration information of the UE. For example, the access barring parameter information may be set for each UE configuration information of the UE. As another example, the access barring parameter information may be set in association with access category information. For example, the access barring parameter information may be set equally or differently for each access category information. As another example, one barring parameter information may be set in association with a plurality of access category information. As further another example, the access barring parameter information may be set in association with both UE configuration information of the UE and the access category information. The barring configuration information may include at least one of barring identification information, barring factor information, barring time information and barring bitmap information according to configuration information of a UE. For example, the barring identification information may mean index information based on types of barring classified according to a pre-set criterion. The barring factor information may include a ratio value for random barring. For example, the UE may extract a random number, compare the number with a barring factor, and perform access control based on the comparing result. The barring time information may include time information, such as a timer related to barring of a UE, or the like. The barring bitmap information is used to determine whether the UE skips the barring check operation by comparing the barring bitmap information with corresponding UE configuration information.

For example, the transmitter 620 may include the information for access control in minimum system information of the system information, and transmit the system information including the information for access control. As another example, the information for access may be received by being included in other system information. In addition, the information for access may be transmitted periodically or every when a specific event occurs.

Meanwhile, the access barring parameter information may be included in specific information of barring configuration information for each access category information. That is, the access barring parameter information may be included in the barring configuration information that is set for each access category information, and the transmitter 620 may transmit the barring configuration information including the access barring parameter information to the UE.

The transmitter 630 may receive the access request information according to an access control operation determined by the UE based on the system information. When the UE is barred to perform corresponding access attempt according to an access barring check operation, the receiver 630 may not receive the access request information. Alternatively, when the access barring check operation is skipped, or access barring is not instructed even when the access barring check operation is performed, the receiver 630 may receive the access request information from the UE.

For example, when access attempt is triggered using the received information for access control, the UE may perform the access barring check operation in the AS layer. For example, the UE may determine whether to perform the barring check operation in a information (including barring parameter information) indicated by the AS layer. More specifically, when the access category information indicates an emergency communication, the UE may skip the barring check operation. As another example, the UE may determine whether to perform the barring check operation using pre-set UE configuration information and barring parameter information.

In addition, the controller 610 controls the overall operation of the base station 600 to manage and perform integrally access control in the next generation mobile communication network, which is needed to perform the embodiments described above.

In addition, the transmitter 620 and the receiver 630 are used to transmit or receive signals, messages, data required to perform embodiments described above to or from a core network entity or the UE.

The standardized specifications or standard documents related to the embodiments described above constitute a part of the present disclosure. Accordingly, it should be construed that the incorporation of the content of the standardized specifications and part of the standard documents into the detailed description and claims is included within the scope of the present disclosure.

The features, structures, configurations, and effects described in the present disclosure are included in at least one embodiment but are not necessarily limited to a particular embodiment. A person skilled in the art can apply the features, structures, configurations, and effects illustrated in the particular embodiment embodiments to another one or more additional embodiment embodiments by combining or modifying such features, structures, configurations, and effects. It should be understood that all such combinations and modifications are included within the scope of the present disclosure Although the exemplary embodiments have been described for illustrative purposes, a person skilled in the art will appreciate that various modifications and applications are possible without departing from the essential characteristics of the present disclosure. For example, the specific components of the exemplary embodiments may be variously modified. The scope of protection of the present disclosure should be construed based on the following claims, and all technical ideas within the scope of equivalents thereof should be construed as being included within the scope of the present disclosure.

What is claimed is:

1. A method of a user equipment (UE) for performing unified access control, the method comprising:
 receiving, by the UE, a system information block type 1 (SIB1) from a base station, the SIB1 including barring information for the unified access control, the barring information being received by the UE through the SIB1 and comprising:
  i) access category information,
  ii) identity information for identifying a set of barring parameters, and
  iii) the set of barring parameters including at least one of a barring factor and a barring time; and
 performing, by the UE, an access barring check associated with an access category, based on the set of barring parameters identified by the identity information,
 wherein the access barring check operation is not performed when an access attempt is triggered for initiating a specific service.

2. The method according to claim 1, wherein the category information indicates one category group among an allowance category group, a differential allowance category group, and a prohibit category group.

3. The method according to claim 2, wherein the set of barring parameters in the differential allowance category group is differentially applied to perform the access barring operation by separately applying barring parameters for a specific access category and barring parameters for another specific access category.

4. The method according to claim 2,
 wherein the UE is prohibited from establishing a radio resource control (RRC) connection in a cell in a corresponding access category, before receiving the SIB1 of the cell.

5. The method according to claim 2, wherein the access barring check operation is not performed according to at least one of the barring factor and barring time, by checking whether access is allowed in a corresponding access category through a barring bitmap included in the set of barring parameters.

6. The method according to claim 5, wherein, when a value is set in the barring bitmap, the access barring check operation is performed such that an access attempt of the corresponding access category is allowed.

7. The method according to claim 6,
 wherein the barring bitmap is in accordance with UE configuration information, and
 wherein the UE configuration information is set as at least one of access classes 11, 12, 13, 14 and 15.

8. The method according to claim 1,
 wherein the access category information is associated with a specific access attempt, and
 wherein the specific access attempt initiates an emergency service.

9. The method according to claim 1, wherein the access category information is set for each access attempt type that is classified based on an application service type of the UE or a transmission signaling processing procedure.

10. A method of a base station for enabling to perform unified access control, the method comprising:
transmitting, by the base station, system information including barring information for the unified access control to a user equipment (UE), wherein the barring information for the unified access control comprises
transmitting, by the base station, a system information block type 1 (SIB1) to a user equipment (UE), the SIB1 including barring information for the unified access control, the barring information being transmitted by the base station through the SIB1 and comprising:
i) access category information,
ii) identity information for identifying a set of barring parameters, and
iii) the set of barring parameters including at least one of a barring factor and a barring time; and
receiving, by the base station, access request information determined based on the transmitted SIB1,
wherein the access request information is received according to a result of performing of an access barring check operation associated with an access category, based on the set of barring parameters identified by the identity information, and
wherein the access barring check operation is not performed when an access attempt is triggered for initiating a specific service.

11. The method according to claim 10,
wherein the category information indicates one category group among an allowance category group, a differential allowance category group, and a prohibit category group,
wherein the access barring check operation is not performed according to at least one of the barring factor and barring time, by checking whether access is allowed in a corresponding access category through a barring bitmap included in the set of barring parameters, and
wherein, when a value is set in the barring bitmap, the access barring check operation is performed such that an access attempt of the corresponding access category is allowed.

12. A user equipment (UE) performing unified access control, the UE comprising:
a receiver configured to receive a system information block type 1 (SIB1) from a base station, the SIB1 including barring information for the unified access control, the barring information being received by the UE through the SIB1 and comprising:
i) access category information,
ii) identity information for identifying a set of barring parameters, and
iii) the set of barring parameters including at least one of a barring factor and a barring time; and
a controller configured to perform an access barring check associated with an access category, based on the set of barring parameters identified by the identity information,
wherein the access barring check operation is not performed when an access attempt is triggered for initiating a specific service.

13. The UE according to claim 12, wherein the category information indicates one category group among an allowance category group, a differential allowance category group, and a prohibit category group.

14. The UE according to claim 13, wherein the set of barring parameters in the differential allowance category group is differentially applied to perform the access barring operation by separately applying barring parameters for a specific access category and barring parameters for another specific access category.

15. The UE according to claim 13,
wherein the UE is prohibited from establishing a radio resource control (RRC) connection in a cell in a corresponding access category, before receiving the SIB1 of the cell.

16. The UE according to claim 13, wherein the access barring check operation is not performed according to at least one of the barring factor and barring time, by checking whether access is allowed in a corresponding access category through a barring bitmap included in the set of barring parameters.

17. The UE according to claim 16, wherein, when a value is set in the barring bitmap, the access barring check operation is performed such that an access attempt of the corresponding access category is allowed.

18. The UE according to claim 16,
wherein the barring bitmap is in accordance with UE configuration information, and
wherein the UE configuration information is set as at least one of access classes 11, 12, 13, 14 and 15.

19. The UE according to claim 12,
wherein the access category information is associated with a specific access attempt, and
wherein the specific access attempt initiates an emergency service.

20. The UE according to claim 12, wherein the access category information is set for each access attempt type that is classified based on an application service type of the UE or a transmission signaling processing procedure.

* * * * *